Patented Oct. 18, 1932

1,883,396

UNITED STATES PATENT OFFICE

WILLIAM HENRY MOSS, OF CUMBERLAND, MARYLAND, ASSIGNOR TO CELANESE CORPORATION OF AMERICA, A CORPORATION OF DELAWARE

METHOD OF COATING

No Drawing.   Application filed March 5, 1929.   Serial No. 344,593.

This invention relates to the coating of surfaces with lacquers containing derivatives of cellulose and relates more particularly to the application of a primer coat or filling coat to such surfaces prior to the application of the lacquer.

An object of my invention is to prepare a suitable filler or primer for the coating of surfaces that are not smooth in order to prepare the same for the application of lacquers containing derivatives of cellulose. Other objects of my invention will appear from the following detailed description.

In the application of lacquers to rough or porous surfaces such as wood it is first necessary to apply a filler or primer coat to the same. The ordinary filler which comprises a coating composition containing drying oils and natural resins is not suitable for use when lacquers containing organic derivatives of cellulose are to be applied, since the films formed from such lacquers do not adhere well to the primer coat. The same is true of shellac or other fillers of this nature. If attempts are made to apply the lacquer directly to the untreated surface, it is not possible completely to fill the grain of the wood in a satisfactory manner, since such lacquers contain only about 20 to 30% of solid constituents when the same is applied to the surface, and when the volatile solvents of the lacquer evaporate, the film formed therefrom shrinks down into the crevices so that the grain is easily seen again. If the film from the lacquer bridges the grain without filling it, air bubbles are formed thereunder, and these air bubbles may cause many difficulties.

I have found that if a substance is used as a filler, which substance contains a major proportion of relatively nonvolatile material that is compatible with the film formed from the lacquer subsequently to be applied, very satisfactory results are obtained.

In accordance with my invention I coat a surface that is not smooth with a filler or priming coat which is in the form of a paste or powder, the greater proportion of which is of relatively nonvolatile material containing such substances as derivatives of cellulose and/or plastifiers. This substance may also contain a small quantity of synthetic resins compatible with the derivative of cellulose that is employed both in the primer coating and in the lacquer subsequently to be applied.

The surfaces to be coated in accordance with my invention are preferably such surfaces that require the application of a primer or filling coat. Such surfaces may be made of either hard or soft wood, ceramic material such as pottery, china or brick, stoneware, concrete, or even metallic surfaces that are not smooth. These surfaces may first be stained to a desired color, if desired. The articles to be treated may be any suitable ones such as furniture, walls, receptacles, machines, vehicle, etc. The filler or primer material in accordance with my invention may be applied by rubbing the same onto the surfaces or pressing the same at suitable temperatures by means of molds or by means of presses in accordance with the configuration of the article, in such manner as to cause cohesion of the ingredients of the filler and adhesion thereof to the surfaces.

The composition to be used as primer may contain any derivative of cellulose such as cellulose nitrate or the organic derivatives of cellulose such as the organic esters of cellulose or cellulose ethers. Examples of organic esters of cellulose are cellulose acetate, cellulose formate, cellulose propionate and cellulose butyrate, while examples of cellulose ethers are ethyl cellulose, methyl cellulose and benzyl cellulose. In order to impart plasticity to the product, suitable plastifiers should preferably be added thereto and examples of these plastifiers are camphor, triacetin, diethyl phthalate, dibutyl phthalate, diethyl tartrate, dibutyl tartrate, monomethyl xylene sulfonamide, the ethyl toluene sulfonamides (meta, ortho, or para) etc.

The composition may be in the form of a solution of a derivative of cellulose in the plastifier, or it may be a finely divided mixture of the plastifier and the derivative of cellulose. In some cases for ease of application, a paste may be formed by moistening a mixture of powdered derivatives of cellulose and plastifier with just sufficient volatile solvent or diluent such as benzene to form the paste.

If desired, any of the synthetic resins compatible with the derivatives of cellulose described below may be added to this mixture, but I prefer to employ very little of the resin, since the presence of a large quantity of resin causes difficulties in the drying of the film of the lacquer that is subsequently applied.

After the application of the primer or filler in accordance with my invention, a suitable lacquer containing a derivative of cellulose may be applied. This lacquer may contain any of the derivatives of cellulose above described, a synthetic resin compatible with the derivative of cellulose employed, plastifiers and suitable solvents. Examples of synthetic resins that may be employed are the fusible and soluble phenol formaldehyde resins prepared in the presence of an acid catalyst, diphenylol propane-formaldehyde resins, toluene sulfonamide-formaldehyde resins, etc. The plastifiers employed in making the lacquer may be any suitable ones such as those described above. The solvent mixture preferably contains low boiling solvents such as acetone, alcohol, benzene, etc., medium boiling solvents such as dioxan, monomethyl ether of ethylene glycol or ethyl lactate; while the high boiling solvents may be diacetone alcohol, benzyl alcohol, etc.

For the best results, I prefer to employ the same derivative of cellulose in the primer or filler as that which is employed in the lacquer that is subsequently applied.

After the filler is applied to the surfaces, and allowed to dry for a period of say one-half hour, the pores or grains of the surface are well filled, and after the lacquer is applied, a smooth satisfactory film is formed.

In order further to illustrate my invention but without being limited thereto the following specific examples are given.

*Example I*

The following is an example of a suitable paste that may be employed as a filler for wood to be applied prior to application of a coat of lacquer in accordance with my invention.

| | Parts by weight |
|---|---|
| Cellulose acetate (in finely powdered form) | 10 |
| Triacetin | 10 |
| Benzene | 10 |

*Example II*

The following is an example wherein no volatile solvent is employed in making the filler.

| | Parts by weight |
|---|---|
| Cellulose acetate (in finely powdered form) | 20 |
| Ethyl-meta-toluene sulfonamide | 80 |

*Example III*

The following is another example of a suitable filler.

| | Parts by weight |
|---|---|
| Cellulose acetate (in finely powdered form) | 40 |
| Diethyl phthalate | 10 |
| Benzene | 40 |

In the application of this filler, the wood surface is first wetted with triacetin and the filler is then rubbed onto the so wetted surface.

In Examples I and III, the benzene may be replaced in whole or in part by toluene, xylene or gasoline. To any of the compositions described in the above examples, there may be added 5 to 10 parts by weight of a pigment such as carbon black or any other suitable pigment.

After the application of the fillers above described, a suitable lacquer may be employed and examples of such lacquers are as follows.

*Example A*

| | Parts by weight |
|---|---|
| Cellulose acetate | 50 |
| Diphenylol propane formaldehyde resin | 50 |
| Acetone | 250 |
| Benzene | 100 |
| Alcohol | 120 |
| Ethyl lactate | 50 |

*Example B*

| | Parts by weight |
|---|---|
| Cellulose acetate | 65 |
| Diphenylol propane formaldehyde resin | 35 |
| Solvents the same as in Example A. | |

To either of the lacquers described in Examples A and B a softener or plastifier such as diethyl phthalate may be added in suitable proportions, say 10 parts by weight. Pigments may also be added in suitable proportions, an example of suitable proportions being 15 parts by weight of pigments such as burnt umber or Prussian blue.

It is to be understood that the foregoing detailed description is given merely by way of illustration and that many variations may be made therein without departing from the spirit of my invention.

Having described my invention, what I claim and desire to secure by Letters Patent is:

1. Method of coating porous surfaces comprising applying to said surfaces a filler coat of a composition that has a consistency ranging from pasty to powdery condition and that contains a major proportion of relatively nonvolatile organic materials consisting of a derivative of cellulose and a plastifier and then applying a lacquer containing a derivative of cellulose.

2. Method of coating porous surfaces comprising applying to said surfaces a filler coat of a composition that has a consistency ranging from pasty to powdery condition and that contains a major proportion of relatively nonvolatile organic materials consisting of cellulose acetate and a plastifier and then applying a lacquer containing cellulose acetate.

3. Method of coating porous surfaces comprising applying to said surfaces a filler coat of a composition that has a pasty consistency and that contains a major proportion of relatively nonvolatile organic materials consisting of a derivative of cellulose and a plastifier and then applying a lacquer containing a derivative of cellulose.

4. Method of coating porous surfaces comprising applying to said surfaces a filler coat of a composition that has a powdery consistency and that contains a major proportion of relatively non-volatile organic materials consisting of a derivative of cellulose and a plastifier and then applying a lacquer containing a derivative of cellulose.

In testimony whereof, I have hereunto subscribed my name.

WILLIAM HENRY MOSS.